United States Patent [19]

Woerner

[11] Patent Number: 5,307,880
[45] Date of Patent: May 3, 1994

[54] SOD ROLL-OUT MACHINE WITH ENDLESS TRACKS

[76] Inventor: Edward E. Woerner, 26250 Bruhn Rd., Elberta, Ala. 36530

[21] Appl. No.: 31,156

[22] Filed: Mar. 12, 1993

[51] Int. Cl.⁵ .............................................. A01B 45/00
[52] U.S. Cl. ..................................... 172/19; 111/901; 172/42; 414/911
[58] Field of Search ..................... 172/19, 20, 42; 414/911; 111/901, 902

[56] References Cited

U.S. PATENT DOCUMENTS

| | | |
|---|---|---|
| 2,440,518 | 4/1948 | Lewis et al. . |
| 2,775,357 | 12/1956 | DeArment ................. 414/911 |
| 2,778,292 | 1/1957 | Kavan . |
| 3,982,711 | 9/1976 | Bradley et al. . |
| 4,091,946 | 5/1978 | Kraeft et al. ............... 414/911 |
| 4,095,706 | 6/1978 | Schwien et al. ............ 414/911 |
| 4,149,640 | 4/1979 | White ........................ 111/901 |
| 4,198,103 | 4/1980 | Ward et al. . |
| 4,266,903 | 5/1981 | Surbrook . |
| 4,645,022 | 2/1987 | Bergquist . |
| 4,711,407 | 12/1987 | Boon ......................... 414/911 |
| 4,754,815 | 7/1988 | Brouwer et al. . |
| 4,762,291 | 8/1988 | Sauber . |
| 4,878,542 | 11/1989 | Brouwer et al. . |
| 4,890,801 | 1/1990 | Brouwer et al. . |
| 4,968,205 | 11/1990 | Biasotto et al. . |
| 5,064,011 | 11/1991 | Ogano et al. . |
| 5,129,462 | 7/1992 | Mail ........................... 172/19 |
| 5,215,278 | 6/1993 | Hess .......................... 414/911 |

OTHER PUBLICATIONS

"Maxi-Roll Sod Installer" Brochure by: Cygnet Sod-of North Baltimore, Ohio.
"Big Savings in Harvesting" by: Cygnet Sod-of North Baltimore, Ohio.

Primary Examiner—Randolph A. Reese
Assistant Examiner—Spencer Warnick
Attorney, Agent, or Firm—Haugen and Nikolai

[57] ABSTRACT

A sod roll-out machine with endless tracks having a low center of gravity to prevent tipping on hills or inclines. The machine can be operated and steered by one person, wherein the roll of sod can be unwound in a forward or reverse direction. A pair of arms are elevated by hydraulic cylinders to facilitate the loading of a roll of sod to the distal ends of the arms, and to maintain the roll of sod slightly above the earth during the unrolling process. Due to the unique two track driving mechanism, the machine can be turned in place and operated in areas having limited accessibility. The tracks are driven by a motor, wherein each track can be individually controlled to be rotated in either a forward or reverse direction. A hydraulic pump is driven by the motor, wherein hydraulic fluid is provided to each of the hydraulic cylinders to control the elevation of each of the elevating arms. A cradle member is defined at the distal end of each arm for receiving a rod which is projecting out each end along an axis of a roll of sod. Hence, the loading and unrolling process is easy to perform. Large rolls of sod can be transported and unrolled thus minimizing the number of rolls of sod required to create a lawn. Further, the manual labor required by the operator is reduced as well.

8 Claims, 2 Drawing Sheets

SOD ROLL-OUT MACHINE WITH ENDLESS TRACKS

BACKGROUND OF THE INVENTION

I. FIELD OF THE INVENTION

This invention relates generally to a machine for laying rolls of sod, and more particularly, to a sod laying machine which can be operated by a single person to unroll sod in a forward or reverse direction.

II. DISCUSSION OF THE PRIOR ART

Laying rolls of sod to produce a lawn is a labor intensive, time consuming yet delicate procedure. Rolls of sod harvested from sod farms are typically very heavy due to the thin layer of earth attached to the roots of the grass. Further, the tensile strength of the sod roll varies from one sod roll to the next due to the moisture content, the thickness of the grass, the age of the grass, and the variety of grass. Consequently, the difficulties in laying rolls of sod due to their weight an varying tensile strength usually requires one to unroll the sod by hand. Further complicating the unrolling procedure is ensuring that the sod roll is unrolled properly to avoid unsightly buckles. Due to different landscaping designs, sod occasionally needs to be rolled out in limited spaces and in areas having restricted accessibility. For instance, structure walls, retaining walls, fences, trees and gardens make the job of laying sod difficult and tedious. Further, the terrain of the land also varies due to hills and uneven grades. Thus, numerous difficulties and obstacles can be encountered when laying rolls of sod.

Various machines have been designed to reduce the labor involved in unrolling layers of sod, and to reduce the time involved. However, most machines suffer from one or more limitations such as limited maneuverability, they have high center of gravities and tip easily on uneven grades including hills, and they can only unroll sod in one direction. Further, they are often complicated and expensive. Finally, they can be difficult to use and require extensive time and patience in adapting a roll of sod to the machine for subsequent unrolling.

U.S. Pat. Nos. 4,890,801, 4,878,542, and 4,754,815 to Brouwer et al teach a sod laying machine. This machine has a front and rear sections articulated together wherein a forward boom includes a drive mechanism for dispensing sod rearwardly and beneath the wheels of the machine. The machine includes a pair of outriggers to prevent tipping of the machine. This machine has a high center of gravity thus requiring significantly long outriggers. Further, this machine can only unroll sod in one direction, namely, rearwardly. Thus, in restricted areas, this machine may not be suitable for a sod laying application requiring the roll sod be unrolled in the forward direction.

U.S. Pat. No. 3,982,711 to Bradley et al describes a sod laying machine which is rather complicated and cumbersome to use. This machine necessitates that individual sod rolls are passed between closely spaced endless drive belts in order to preserve the integrity of the roll. This machines takes up a considerable amount of space, is difficult to maneuver, and can only dispense rolls of sod in one direction. Further, it is adapted to be pulled by a tractor and is not adapted to be used or steered by an individual.

Thus, a sod laying machine which can lay rolls of sod in either the forward or a rear direction, which is easily maneuverable, and not subject to tipping on hills is very desirable. Further, a machine which can unroll large rolls of sod to reduce the total number of sod rolls required and to reduce the number of gaps between rolls of sod is desirable as well. Finally, an inexpensive, easy to use machine which is adapted to be operated by a single person is desirable as well.

OBJECTS OF THE INVENTION

Accordingly, it is primary object of the foregoing invention to provide a sod laying machine which can be used on uneven grades and hills and is not subject to tipping.

It is a further object of the present invention to provide a sod laying machine which can be easily steered and is adapted to be used by a single person.

It is still yet another object of the present invention to provide a sod laying machine which can unroll sod rolls in either the forward or rearward direction.

It is still yet another object of the present invention to provide a sod laying machine which can be quickly and easily adapted to a roll of sod to reduce the overall time required to create a lawn.

It is still yet another object of the present invention to provide a sod laying machine which can make sharp turns and which is maneuverable in areas having restricted accessibility.

It is still yet a further object of the present invention to provide a sod laying machine which can unroll sod without buckling, and which does not subject the roll of sod to excessive tensile forces which could cause tearing of the roll of sod.

SUMMARY OF THE INVENTION

The foregoing objects and advantages of the present invention are achieved by providing a sod laying machine propelled and steered by a pair of spaced apart continuous tracks. A dispensing apparatus is positionable in the clearance defined between each of the tracks and proximate the earth such that the sod laying machine has a low center of gravity and is not susceptible to tipping on uneven grades or hills. The implementation of the continuous tracks allows one to easily steer the machine, wherein a large roll of sod can be unrolled between the tracks in either the forward or rearward direction.

The sod laying machine comprises a frame having a first and second opposing side, wherein a first and second driving mechanism, preferably a continuous track, is coupled to each one of the respective first and second sides of the frame. The continuous tracks propel the frame upon the earth, wherein the first and second tracks define a clearance therebetween having a width greater than the width of a sod roll. A steering mechanism forms a part of the driving mechanism for steering the frame with respect to the earth. An attachment mechanism is provided which is adaptable to a roll of sod such that the roll of sod can be rotated about an axis thereof. An adjustable lift mechanism is coupled to the frame and is adapted t receive the attachment mechanism which is adapted to a roll of sod. The lift mechanism can elevate the attachment mechanism and the roll of the sod above the earth such that the sod roll surface is closely proximate the earth, such that the roll of sod can be unrolled in the clearance defined between the first and second tracks as the frame is propelled in either forward or rearward direction.

In the preferred embodiment of the present invention, the first and second driving mechanisms are each comprised of a endless track, wherein a single motor is adapted to each track for selectively driving one or both of the tracks to propel and/or turn the frame with respect to the earth. The lift mechanism preferably comprises a pair of arms each rotatably attached at a proximal end to one of the respective sides of the frame, wherein each arm has a distal end adapted to selectively couple and receive the attachment means. The attachment means preferably comprises an elongated rod, wherein each of the distal ends of each arm includes a cradle portion adapted to receive each end of the rod. Further, the distal ends of each arm further include a stop plate proximate the cradles for restricting longitudinal movement of the rod when it is disposed in each of the cradles.

The elevating mechanism preferably comprises a pair of hydraulic cylinders and a hydraulic pump driven by the engine of the drive mechanism, wherein a separate hydraulic cylinder is secured between each respective side of the frame and the midsection of the respective arm. The steering mechanism preferably comprises a pair of levered handles, each one operatively controlling engagement of the respective endless track to the motor, wherein the separate handles are positioned on each side of the frame such that they are accessible and controllable by a single person. A control mechanism or lever is provided for controlling an elevating mechanism of the lifting mechanism and is disposed proximate the levered handles such that the operator can conveniently and continuously adjust the elevation of the sod roll above the earth while steering the machine.

One key feature of the present invention is that the machine has a low center of gravity due to the large spacing of the driving tracks. Consequently, when a roll of sod which is positioned between the tracks and dispensed therefrom the machine is not easily subjected to tipping on hills. When unrolling the rolls of sod, the elevating mechanism avoids tearing the sod roll by positioning the outer surface of the roll of sod slightly above the earth such that the tension in the sod roll does not exceed the tensile strength of the sod roll. By positioning the roll of sod slightly above the surface of the earth, buckling is also avoided. Due to the unique design of the machine having a pair of continuous tracks, the roll of sod can be unrolled in either forward or rearward direction. Also important to note is that the machine can be operated by a single person, wherein the machine can be easily maneuvered and rotated 180° in a small area. Thus, the machine can be used in tight areas having restricted accessibility. The attachment mechanism or bar can be quickly inserted through the axis of one roll of sod, wherein each bar end can then be quickly inserted into the respective cradle defined at the distal end of the lifting arms. Thus, many rolls of sod can be quickly adapted to the machine for subsequent unrolling to facilitate a quick installation time. The machine is easy to use, relatively inexpensive, and can efficiently unroll many rolls of sod without damage. Since the driving mechanism is comprised of endless tracks having a large surface area, the weight of the machine is evenly distributed. Hence, the machine can be driven across laid sod without damaging the sod.

The foregoing features, objects, and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
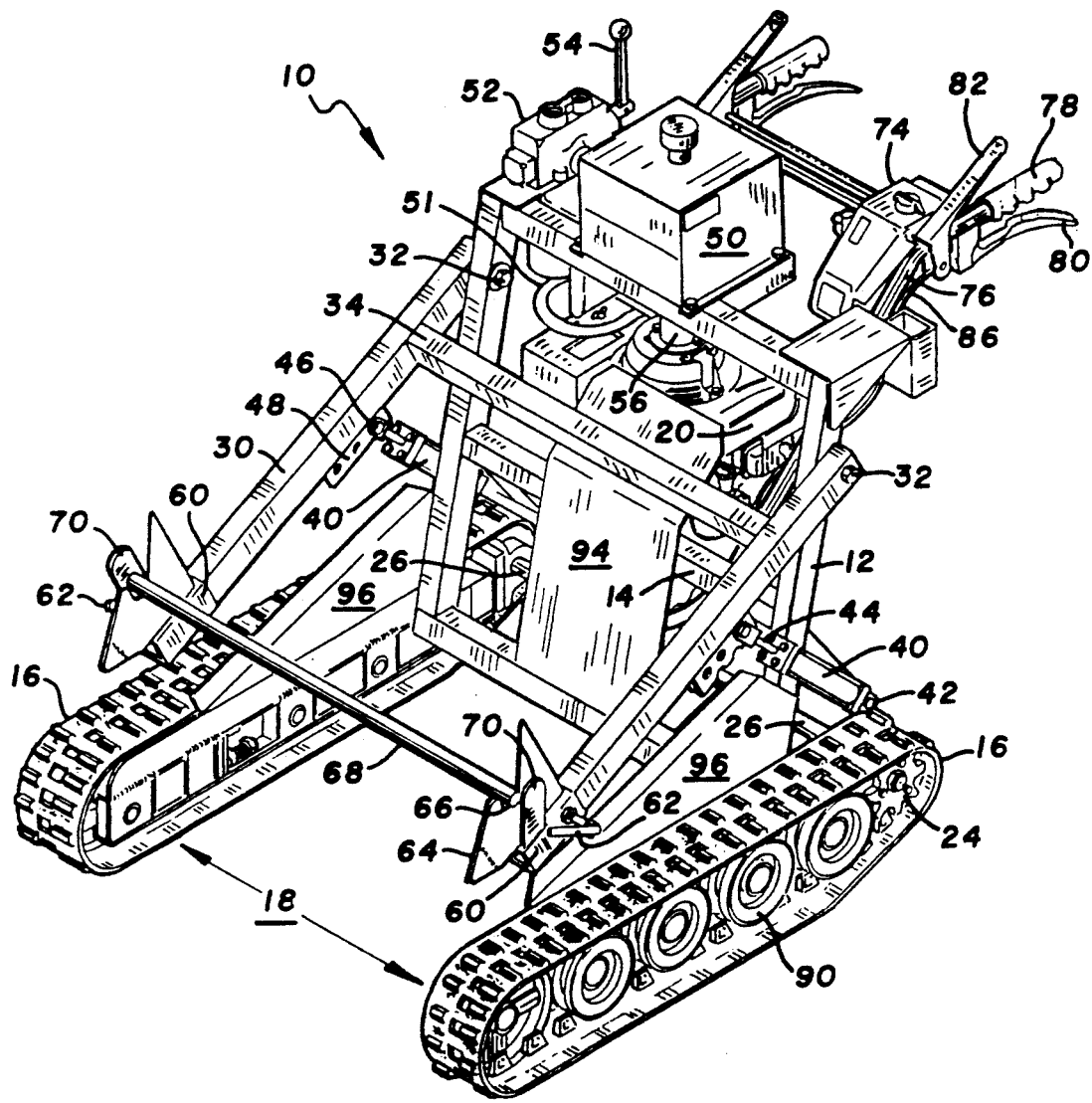
FIG. 1 illustrates a perspective view of a sod laying machine according to the preferred embodiment of the invention. A pair of continuous tracks are defined on opposite sides of a frame and provide a clearance therebetween for unrolling a roll of sod. Each of a pair of handles controls engagement of a respective track with the drive motor. A control lever controls the elevation of a pair of lifting arms.

A perspective view of a sod laying machine according to the preferred embodiment of the present invention is generally shown in FIG. 1 at 10. Sod laying machine 10 comprises a rigid rectangular frame 12 formed of hollowed steel tubing and which is structurally reinforced by a laterally extending rigid brace member 14 comprised of similar material. A pair of cleated continuous drive tracks 16 are rotatably adapted to each side of frame 12 and define a large clearance 18 therebetween for accommodating a roll of sod as will be discussed shortly. Each of drive tracks 16 are adapted to be independently driven by a single combustion engine 20 which is fixedly secured to a rear portion of frame 12 as shown. Motor 20 selectively engages and rotatably drives a drive sprocket 24 defined within a rear portion of each track 16 via a separate respective drive shaft 26 as shown. Either one, or both, of the drive shafts 26 can be selectively engaged and driven by motor 20 to rotate the corresponding drive sprocket 24 and corresponding continuous track 16. The drive gear of machine 10 is selected using handle 28, wherein the machine can be propelled in the forward direction in several gears, and in the reverse direction. This arrangement facilitates driving machine 10 across the earth. Steering is facilitated by engaging only one of drive tracks 16. The drive gear of machine 10 is selected using handle 28, wherein the machine can be propelled in the forward direction in several gears, and in the reverse direction. The vehicle described thus far is well known and commercially sold by the American Honda Corporation as Model No. HP400.

According to the preferred embodiment of the invention, sod laying machine 10 further comprises a pair of opposing parallel elongated rigid arms 30. Each arm 30 is pivotally attached to an upper portion of each side of housing frame 12 via a bolt 32. Each arm 30 is secured to the other by an elongated rigid tubular steel brace 34 as shown. Brace 34 maintains a fixed spacing of arms 30, and also rigidly couples each arm 30 one to the other such that when one is subsequently raised or lowered, the other is correspondingly raised or lower as well. Each arm 30 is sufficiently spaced from the other to receive a large roll of sod therebetween. Rolls of sod up to 100 yards in length can be accommodated.

A pair of hydraulic cylinders 40 provide for elevating or lowering each arm 30 as will be described shortly. Each cylinder 40 extends between a lower rear portion of frame 12 and the midsection of respective arm 30 at about a 45° angle. Each cylinder 40 is rotatably coupled at one end to frame 12 at a lower end 42, and includes a longitudinally slideable rod or piston 44 which is slideable within the housing of cylinder 40. Each rod 44 is also rotatably coupled at an opposite end 46 to a respective mounting bracket 48 which is fixedly attached to a lower midsection portion of each respective arm 30 as shown. Rod 44 can be rotatably coupled to bracket 48 at one of three different integrally defined holes to facilitate adjusting the lowermost and uppermost elevation of rod 68 above the ground. Consequently, as hydraulic fluid is injected into the cylinder 40, rod 44 longitudinally slides outward from cylinder 40 causing each arm 30 to be urged and leveraged away from each respective cylinder 40 to elevate both arms 30. A hydraulic pump 50 is located proximate and fixedly attached to an upper midsection of frame 12 as shown. A hydraulic valve 52 having a handle or lever 54 controls the direction of hydraulic fluid flow to and from pump 50 to each cylinder 40. Pump 50 is operatively driven by engine 20 via a drive shaft 56, and draws or injects hydraulic fluid into a hydraulic fluid sump (not shown). In operation, the operator activates lever 54 to correspondingly cause valve 52 to allow injection of hydraulic fluid from pump 50 to each of hydraulic cylinders 40. Lever 54 has a first or vertical centered position such that no fluid is injected into or removed from each of cylinders 40 such that each arm 30 maintains a current position or elevation. If the operator advances lever 54 counterclockwise to the left and second position, valve 52 correspondingly allows fluid to uniformly pass from pump 50 into each cylinder 40 thus causing each arm 30 to elevate. Similarly, advancing lever 54 clockwise to the right and third position allows fluid to be uniformly released from each or cylinders 40 to the sump such that the weight of each arm 30, and the weight of the sod roll, acting on each cylinder 40 lowers each arm 30. It is noted the arms could be operated pneumatically, or electrically, and limitation to hydraulically operated arms is not to be inferred.

A bracket 60 is slideably disposed about and along each arm 30 as shown. A respective handle or lever 62 selectively secures each bracket 60 to the respective arm 30 when lever 62 is rotated clockwise to engage the respective arm 30. Each bracket 60 further comprises an integral cradle plate 64 extending vertically upward from an upper surface thereof. Each cradle plate 64 includes a notch 66 for receiving an elongated attachment rod 68 which can reside in each notch 66 of each cradle 64 as shown. Thus, rod 68 can be conveniently removed and inserted to through the midsection of a roll of sod, and a spool or center hub if used, along an axis thereof, and then reinserted into the notch 66 of each cradle member 64. Each bracket 60 also includes a rigid restriction tab or plate 70. Each plate 70 extends vertically upward from bracket 60 and parallel to each respective cradle plate 64 along the outwardly facing surface of cradle plate 64 and proximate notch 66. Each restricting member 70 prevents rod 68 from sliding in the lateral direction. Thus, each plate 70 forms a portion of the attachment mechanism to help constrain rod 68 at each end within notch 66 of cradle plate 64.

Next, the various control features of machine 10 will be described in detail. A pair of tubular handlebars 76 extend rearwardly and upwardly from a rear portion of frame member 12, as shown. Machine 10 includes an ignition control box 74 which is attached to the left handlebar 76 for controlling the speed and operation of engine 20. A handle grip 78 is fixedly attached about a distal end of each handlebar 76 to provide a grip for the hands of the operator. A first steering clutch lever 80 is pivotally attached to a lower portion of each handlebar 76 as shown, and an upper drive clutch control lever 82 is pivotally attached to an upper portion of each handlebar 76 as shown. Each of steering clutch control levers 80 are fixedly attached to a distal end of a respective flexible cable 86 which extends downwardly along respective handlebar 76 to a control box (not shown). Cables 86 correspondingly cause motor 20 to engage the corresponding respective steering clutch mechanism via the control box such that the drive shafts 26 are selectively engaged for propelling and steering. Pulling up on the right steering clutch 80 causes the machine to steer right, and pulling up on the left steering clutch causes the machine 10 to steer left.

By squeezing each drive clutch lever 82 towards handle grip 78, a cable within handlebar 76 (not shown) is caused to longitudinally slide forward causing motor 20 to engage the respective shaft 26 to propel corresponding track 16. If just one drive clutch lever 82 is squeezed towards handle 78, the respective cable (not shown) is caused to longitudinally slide downward within handlebar 76 such that the control box (not shown) causes motor 20 to drive corresponding track 16. Thus, steering clutch control levers 80 control steering each corresponding track 16, and drive clutch control levers 82 control driving the corresponding track 16 in the forward or rearward direction, as chosen by control handle 28. This arrangement provides an arrangement such that machine 10 can either be driven in the forward or rearward direction, and steered to the right or to the left.

For instance, both drive clutch levers 82 can be squeezed toward respective handle grip 78 causing the motor to engage both respective tracks 16 to drive machine 10 in the forward direction. Drive gear control lever 28 determines which forward gear is chosen, or if the machine is engaged in reverse. Again, the control mechanism including levers 80 and 82 are well known and standard on the American Honda Machine No. HP400.

To steer and turn machine 10, one steering clutch lever 80 is squeezed towards one handle grip 78 while both drive clutch lever 82 proximate the handle grip 78 are also squeezed, causing one track 16 to rotate slightly faster than the other. This arrangement allows machine 10 to be rotated to the right or left, similar to how a military tank is driven and steered. However, it is possible that one track can be rotated in one direction while the other track is disengaged to turn machine 10 to reduce the turning radius. Thus, it is only necessary one track be engaged, such as using drive clutch levers 82, to facilitate a turn wherein the other track would remain motionless and disengaged. As shown, each drive track 16 comprises a plurality of wheels 90 wherein the drive track arrangement in itself is well known in the art.

A rear protector plate 94 is provided and is secured to a central portion of frame 12 and brace 14 as shown. Plate 94 protects loose soil which can break away from a roll of sod as it is unrolled from being thrown upon engine 20 and other mechanical components.

A pair of side protector plates 96 are provided and adapted to frame 12 and extend upwardly and parallel to each respective track 16. Side plates 96 restrict the edges of the roll of sod being unwound from becoming entangled with each drive track 16.

OPERATION

Figure 2:
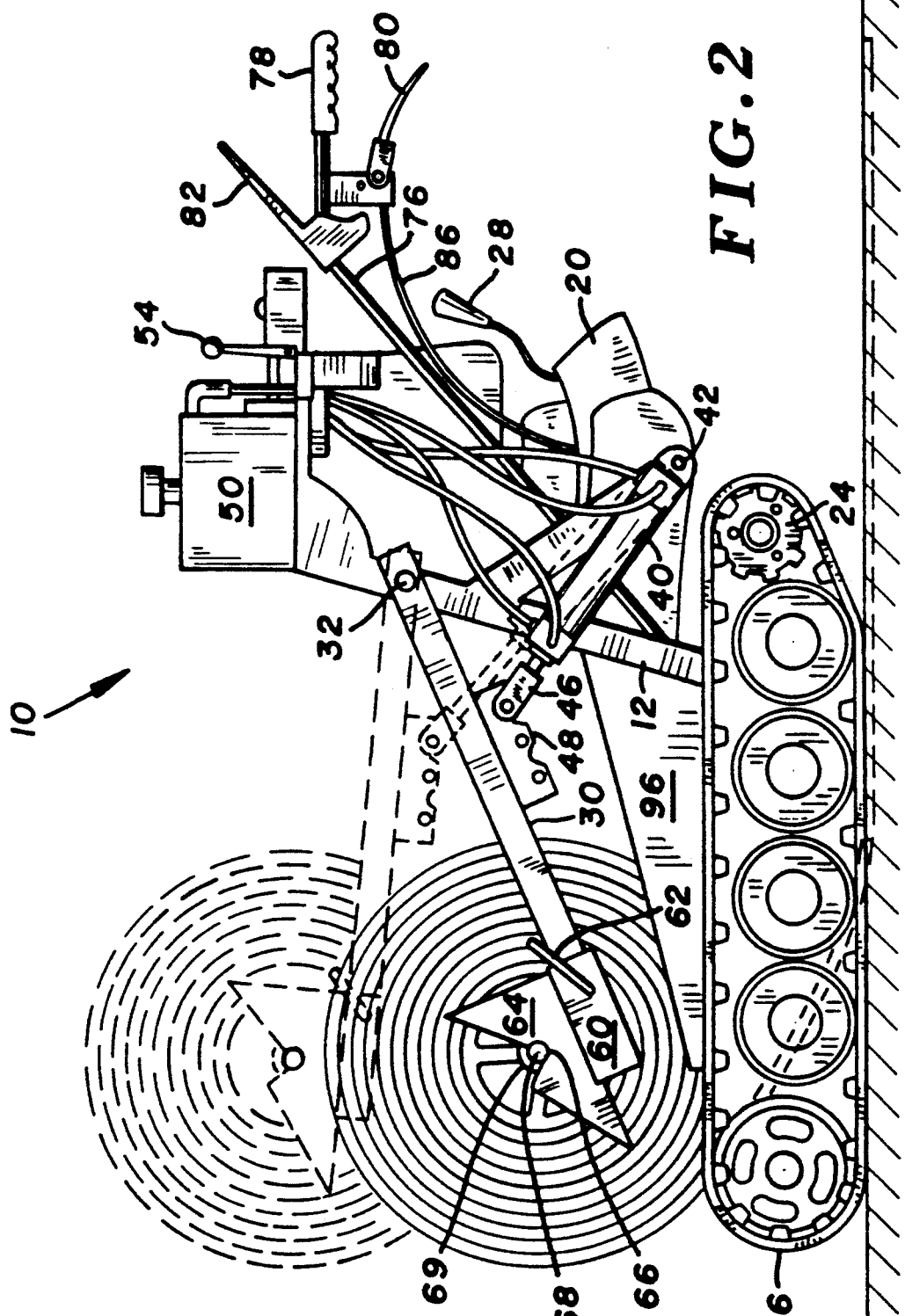
FIG. 2 illustrates a profile view of the sod laying machine with the hydraulic lifting arms in a lowered position for unrolling sod, wherein the dotted lines illustrates an elevated position when transporting the sod roll.

In operation, to facilitate unrolling a roll of sod, bar 68 is first removed from each cradle plate 64 by simply lifting bar 68 in the upward direction. The operator inserts bar 68 through a center tubular spool or hub member shown at 69, which extends along the center axis of the sod roll. (See FIG. 2). Next, machine 10 is driven in position about each side of the roll of sod. Then each arm 30 is raised from a lowermost position upward about each side of the roll of sod until each en of bar rod 68 which is projecting from each side of the sod roll is received into each notch 66 of the respective cradle plate 64. Next, control handle 54 is rotated counterclockwise (to the left) causing hydraulic fluid to be communicated from pump 50, through a pair of respective hydraulic passageways 51, and injected into to each of cylinders 40. This causes each rod 44 to longitudinally slide outward therefrom, which in turn causes each arm 30 to elevate. Consequently, the distal end of each arm 30 including cradle plate 64 is elevated to elevate bar 68 and the accompanying roll of sod.

To unroll the roll of sod, machine 10 is first driven to a desired location where the operator wishes to unroll the roll of sod. Next, the operator rotates control handle 54 clockwise and to the right to release hydraulic fluid from each cylinder 40 until the distal end of each arm 30 is lowered such that the outer surface of the roll of sod is just above or in contact with the surface of the earth. The end of the roll of sod is secured to the earth by using a stake which is inserted through the roll of sod into the earth, or held by an assistant. Next, the operator uses levers 80 and 82 to maneuver machine 10 in a forward or reverse direction, depending on whether the sod was rolled with the grass facing outwardly or inwardly. If the grass was rolled with the grass facing outwardly, machine 10 is driven in the rearward direction such that the roll of sod will be laid upon the earth with the grass facing up. Conversely, if the grass is rolled facing inward with the dirt facing outwardly, machine 10 is propelled in the forward direction causing machine 10 to be driven above and about the laid portion of the roll of sod. Thus, machine 10 is adapted to unroll the roll of sod in either forward direction or rearward direction depending on how the roll of sod is wound, without steering drive tracks 16 upon the laid sod.

As the roll of sod is unrolled, the operator intermittently uses handle 54 to lower each arm 30 downward to keep the outer surface of the roll of sod proximate, but spaced apart from, the surface of the earth. This maintains a uniform tension on the roll of sod during the unrolling process, and further generates a force to unroll the sod which is generally along the plane of the already laid portion of sod which avoids tearing the sod. Due to the unique control feature of handle 54 controlling the elevation of each arms 30, the operator can conveniently control the elevation of each arms 30 as the roll of sod is being unwound. Further, the handle 54 is conveniently accessible by the operator, wherein the operator has good visibility of the roll of sod during loading of the roll of sod and rod 68 into notches 66 of the cradle plate 64 of each arm 30. Thus, loading the roll of sod onto arms 30, and dispensing the roll of sod upon the earth, is conveniently facilitated.

One principal feature of the present invention is that machine 10 has a low center gravity since tracks 16 are spaced apart from one another, and because motor 20 is adapted to a lower portion of frame 12. Thus, a roll of sod can be transported and laid upon the earth on an inclined surface without risking tipping machine 10 and without requiring outriggers. Another feature is that the drive tracks 16 are wide and evenly distribute the weight of the machine on the surfaces of the tracks such that the machine can be driven across laid sod without causing major damage to the unrolled sod. Sod rolls of up to 100 yards can be transported, rolled and unrolled by the present invention. Hence, a large area can be sodded quickly and conveniently. Because the lifting arm is hydraulically operated, it has great strength to lift large rolls of sod.

In summary, a practical sod laying machine has been described which can be operated by a single person, which is easy to steer, and which is not subject to tipping on inclined surfaces. The machine is adapted to conveniently receive a large roll of sod, wherein visibility during the loading procedure is maintained to ensure a quick and easy loading process. The machine has a small turning radius, and can be turned in place when one track is rotated in one direction while the other track is rotated in the opposite direction. Finally, the loading arms are pneumatically elevated such that the roll of sod can be elevated while transported and can remain proximate the earth while being unrolled.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

In the claims:

I claim:

1. A sod laying machine for unrolling a sod roll upon the earth, comprising:
   (a) a frame having a first and second opposing side;
   (b) first and second driving means coupled to said first and second sides of said frame, respectively, for propelling said frame above the earth, said first and second driving means defining a clearance horizontally therebetween having a width greater than the width of the sod roll;
   (c) steering means operatively coupled to said first and second driving means for steering said frame with respect to the earth;
   (d) attachment means for receiving a roll of sod such that said roll of sod is rotatable about an axis thereof, said roll of sod being located within the clearance; and
   (e) lifting means coupled to said frame for selectively elevating said attachment means above the earth, said lifting means adapted to receive said attachment means such that the roll of sod can be unrolled from within said clearance between said first and second driving means when said frame is propelled in either a forward or rearward direction.

2. The sod laying machine as specified in claim 1 wherein said first and second driving means are each comprised of an endless track, said machine further comprising a motor selectively driving each said endless track.

3. The sod laying machine as specified in claim 2 wherein said lifting means comprises a pair of arms each rotatably coupled at a proximal end to one of said sides of said frame, each said arm having a distal end adapted to selectively couple to said attachment means.

4. The sod laying machine as specified in claim 3 wherein said distal ends of each said arms comprises an upwardly opening cradle portion and said attachment means comprises an elongated rod having a pair of ends each selectively receivable into said cradles of said arms.

5. The sod laying machine as specified in claim 4 wherein said distal ends of said arms further comprise stop means proximate and lateral of said cradles for restricting lateral movement of said rod when disposed in each said cradles of said arms.

6. The sod laying machine as specified in claim 3 wherein said lifting means further comprises a pair of hydraulic cylinders, wherein each said hydraulic cylinder is secured between said frame and a midsection of each respective said arms.

7. The sod laying machine as specified in claim 2 wherein said steering means comprises a pair of levered handles each operatively controlling engagement of said motor with said endless tracks, wherein one said handle is coupled to each said first and second side of said frame.

8. The sod laying machine as specified in claim 7 further comprising control means disposed proximate said levered handles for controlling said lifting means.

* * * * *